US006256188B1

United States Patent
Lovkvist et al.

(12) United States Patent
(10) Patent No.: US 6,256,188 B1
(45) Date of Patent: Jul. 3, 2001

(54) POWER CAPACITOR

(75) Inventors: Thomas Lovkvist; Henri Bonhomme, both of Charleroi; Cipriano Monni, Carnieres, all of (BE)

(73) Assignee: Asea Brown Boveri Jumet S.A. (ABB), Charleroi (BE)

( * ) Notice: Subject to any disclaimer, the term of this patent is extended or adjusted under 35 U.S.C. 154(b) by 0 days.

(21) Appl. No.: 09/269,726

(22) PCT Filed: Oct. 2, 1997

(86) PCT No.: PCT/BE97/00114

§ 371 Date: Apr. 2, 1999

§ 102(e) Date: Apr. 2, 1999

(87) PCT Pub. No.: WO98/14965

PCT Pub. Date: Apr. 9, 1998

(30) Foreign Application Priority Data

Feb. 10, 1996 (BE) .................................................. 9600828

(51) Int. Cl.[7] ................................. H01G 4/00; H01G 2/10
(52) U.S. Cl. ........................ 361/301.3; 361/328; 361/517; 361/535
(58) Field of Search ............................... 361/301.3, 301.4, 361/301.5, 313, 328, 511, 517, 518, 535–536; 174/35 R

(56) References Cited

U.S. PATENT DOCUMENTS

| Re. 28,015 | * | 5/1974 | Vermilyea et al. | 361/511 |
| 2,535,945 | * | 12/1950 | Menschik et al. | 361/511 |
| 3,321,677 | * | 5/1967 | Mandelcorn et al. | 361/511 |
| 3,331,993 | * | 7/1967 | Brown et al. | 361/511 |
| 5,306,887 | * | 4/1994 | Smith | 219/772 |

FOREIGN PATENT DOCUMENTS 002028855 12/1982 (EP) .
03154398 2/1991 (JP) .

* cited by examiner

Primary Examiner—Anthony Dinkins
(74) Attorney, Agent, or Firm—Jacobson Holman, PLLC

(57) ABSTRACT

A power capacitor has at least one capacitor unit, each capacitor unit formed of at least one winding, having at least two foils of insulating material, wherein the capacitor unit(s) is (are) housed in a casing of which at least the body is made of extruded aluminum, which body surrounds said capacitor unit(s).

10 Claims, 3 Drawing Sheets

POWER CAPACITOR

The present invention relates to a power capacitor comprising at least one capacitor unit, each capacitor unit comprising at least one winding, having at least two foils of insulating material.

Power capacitors are for example known from the French patent No 2.598.024. The casing surrounds one or more capacitor units and each unit comprises at least one winding, having at least two foils made of insulating material. For the known capacitor, the casing is made of plastic material. However casings made by pressing of aluminum or steel are also known.

A drawback of the steel casings, made by pressing, is that the cutting, folding, assembling, welding and painting of them is a work which takes a lot of time and makes such a manufacturing expensive. Moreover when the casing is manufactured, it is also difficult for integrating therein fixing points, to enable fixing the capacitor components. Moreover, those casings also form a burden for the environment, because their recycling is not obvious. On the other hand, casings made of plastic material are more easy to recycle, but their resistance to high temperature fluctuations is poor and they do not enable a good thermal exchange because the used plastic material is a bad thermal conductor. The casings made by pressing of aluminum are poorly resistant from a mechanical point of view due to their thin walls.

It is an object of the invention to present a power capacitor, having a casing manufactured according to a different manner, which is easier and cheaper to manufacture and which enables a better thermal exchange and resistance.

To that purpose a power capacitor according to the invention is characterized in that the capacitor unit(s) is (are) housed in a casing of which at least the body is made of extruded aluminum, which body surrounds a (the) capacitor unit(s). Extruded aluminum offers the advantage to present a casing which is highly mechanically resistant, even more resistant than pressed steel. Moreover extruded aluminum is easy and cheap to manufacture and it has a good resistance to corrosion without having to apply a paint layer thereon. Its thermal properties are also excellent.

It should be noted that the use of extruded aluminum to fix thereon a capacitor is described in article IBM Technical Disclosure Bulletin vol. 25 n° 7a December 1992, US p. 3419 and called "Technique for mounting bulky discrete components on printed circuit boards".

However that article does not concern power capacitors. Moreover those capacitors are not cased but simply fixed to a support, made of extruded aluminum. That document therefore does not teach the use of extruded aluminum as casing for storing therein windings of a capacitor, but is limited to a fixing element for fixing a capacitor, which itself is housed in a conventional housing.

The document "Patents abstracts of Japan vol. 15 n° 383 (E-1116)" of Dec. 27, 1991, also describes a casing in extruded aluminum, but does not specify that it is the windings of a power capacitor which are housed in that casing.

A first preferred embodiment of a power capacitor according to the invention is characterized in that said casing is provided with cooling wings obtained upon extruding of the casing. The cooling wings can easily be formed during the extrusion process and they contribute to the good thermal exchange of the casing.

A second preferred embodiment of a power capacitor according to the invention is characterized in that said casing is galvanized. Galvanization of the casing makes the latter more resistant to corrosion and enables to give a more esthetical aspect to the casing.

A third preferred embodiment of a power capacitor according to the invention is characterized in that at least one internal side of the casing is provided with fixing grooves, for fixing capacitor components. Those fixing grooves can be easily integrated during the extrusion itself.

A fourth preferred embodiment of a power capacitor according to the invention is characterized in that at least one internal side of the casing is provided with an earth groove, of which the internal wall is provided with screw thread for applying a screw. This is particularly advantageous for making an earth connection.

Preferably at least one external side of the casing is provided with at least one slide rail. In such a manner several casings can be connected together.

The invention will now be described by means of the drawings, which show an example of a power capacitor according to the invention. In the drawings.

Figure 1:
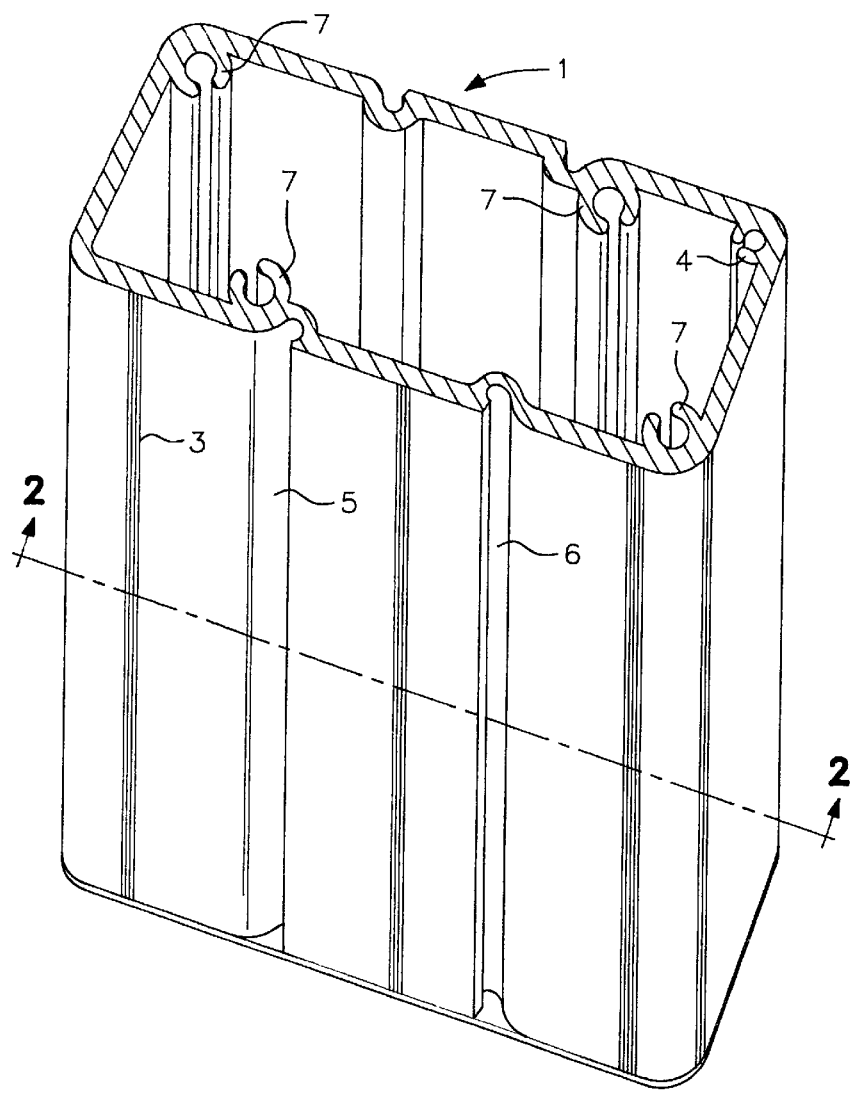
FIG. 1 shows a total view of a power capacitor according to the invention.

In the drawings a same reference sign has been assigned to a same or analogous element.

Figure 2:
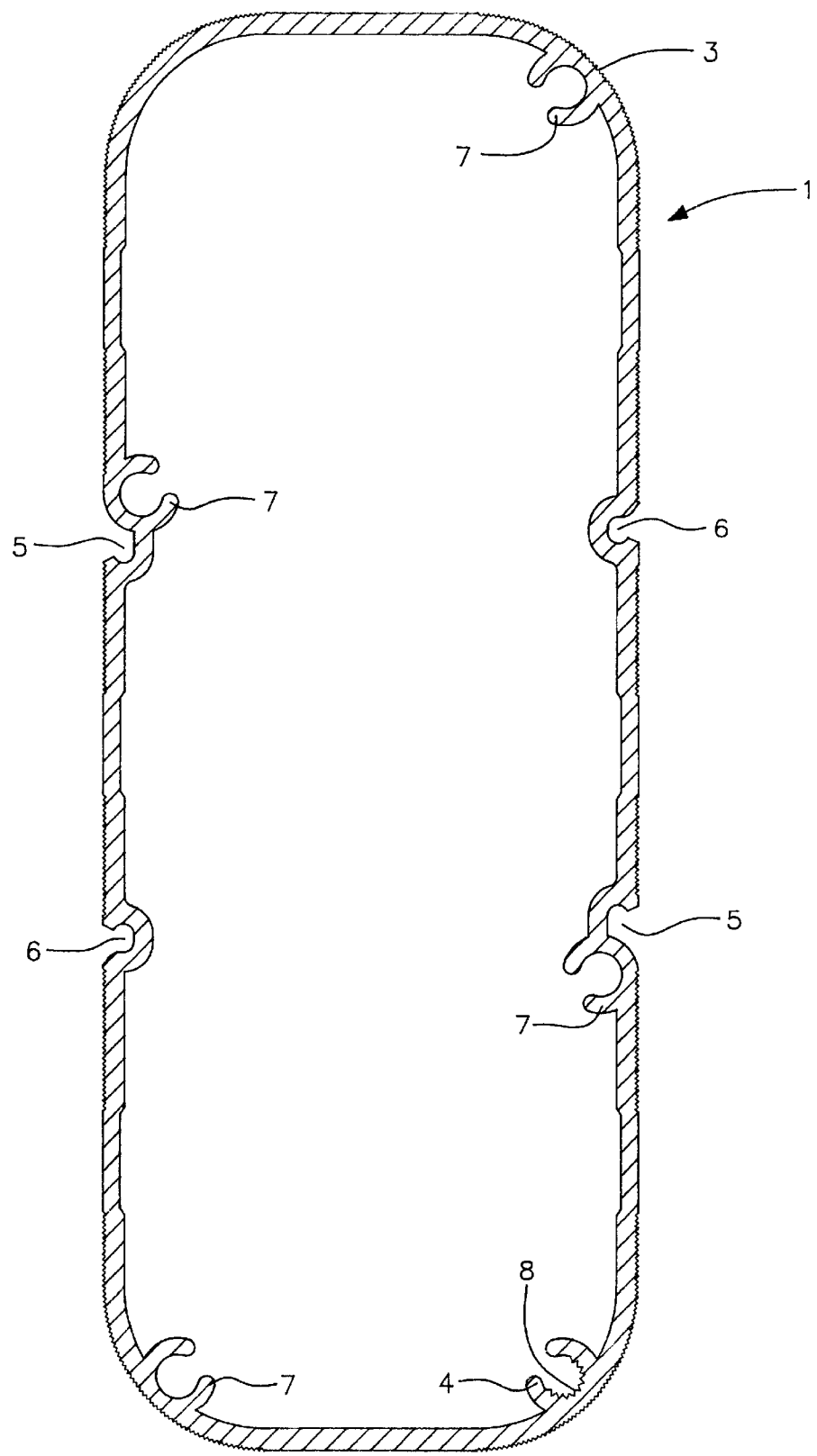
FIG. 2 shows a cross-section along the line II–II' (FIG. 1)

The casing 1, shown in the FIGS. 1 and 2, and in which one or several capacitor units are lodged, comprises walls 2, manufactured in extruded aluminum. The extrusion of aluminum is a well known method, which is also used for the manufacturing of, for example, window frames. Extruded aluminum enables to mechanically manufacture bodies and covers of casings, which are extremely resistant. Extruded aluminum is also resistant to corrosion, which is advantageous when the capacitor has to be used in an environment having a high humidity level or in an environment having a high salt level. The corrosion resistance can be even more improved by galvanization of the extruded aluminum. That galvanization also enables to color the casing, which gives it a more esthetical external aspect. The extrusion technology offers also excellent thermal exchange properties, enabling not only resistance to large temperature fluctuations but also to dissipate the heat, which would be produced by the power capacitor. Moreover, the technology is environmentally friendly whereas the recycling of aluminum can be easily realized.

The casing 1 comprises preferably cooling wings 3, which are formed during the aluminum extrusion process itself. Those cooling wings enable to improve the heat dissipation. The fact that those cooling wings are formed during the extrusion process enables a cheaper manufacturing.

The casing 1 comprises also, on at least one internal side, at least one earth groove 4, of which the wall is provided with screw thread 8, provided for applying a screw therein. An earth wire can also be fixed to the casing by means of the screw thread 8 in the earth groove, which screw thread enables to screw a screw therein, to which the earth wire is attached.

At least one fixing groove 7 is provided on the internal side of the casing 1. Those fixing grooves extend over the whole depth of the casing, which is due to the extrusion of the aluminum, of which the casing is made. The fixing grooves preferably have an omega profile, which enables to introduce therein fixing pins to fix the bottom of the casing. Preferably the fixing pins are provided at diagonally opposed sides, which enables to strengthen the sides.

Figure 3:
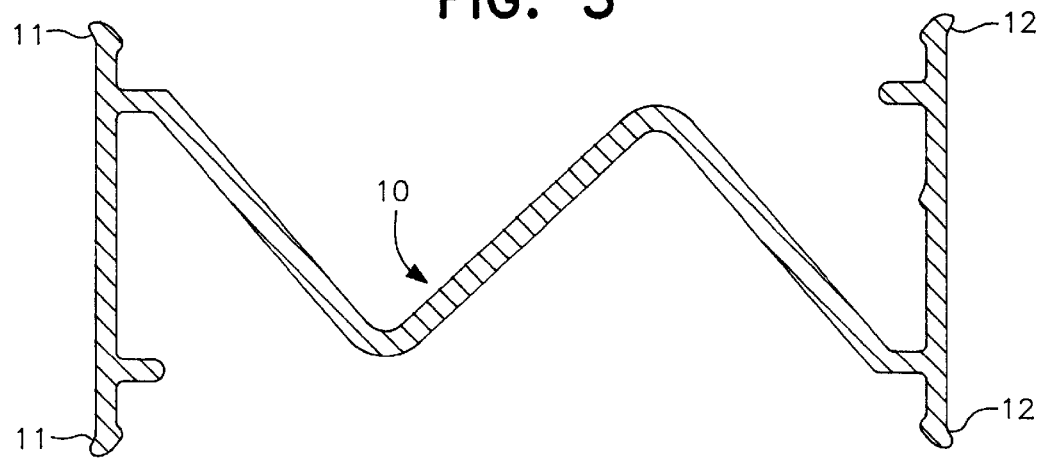
FIG. 3 shows a fixing element, provided for connecting two casings among them.

The casing 1 is also provided with at least one sliding rail 5, 6. That sliding rail enables to apply therein a fixing element 10, such as illustrated in FIG. 3. The fixing element comprises two extremities 11 and 12, which both grip in the fixing groove of a different casing, and thus enable to connect two casings among them. The fixing groove is also formed during the extrusion process for the casing. Preferably the fixing element is also manufactured in aluminum. The sliding rail is of course applied on at least one external side of the casing. Preferably the fixing groove 7 and at least one of the sliding rails 5 are back to back which reinforces the casing and facilitates the extrusion. Moreover, the placing of the fixing groove and the sliding rail on approximately one and two thirds of the,length of the lateral sides of the casing, enables not to disturb the placing of the windings forming the capacitor, when three windings are stored within the casing. Such as illustrated in FIG. 2, the fixing grooves 7 are applied in a symmetrical manner with respect to the center of the casing.

The casing 1 is closed by a bottom 9 and by a cover (not shown).

Figure 4:
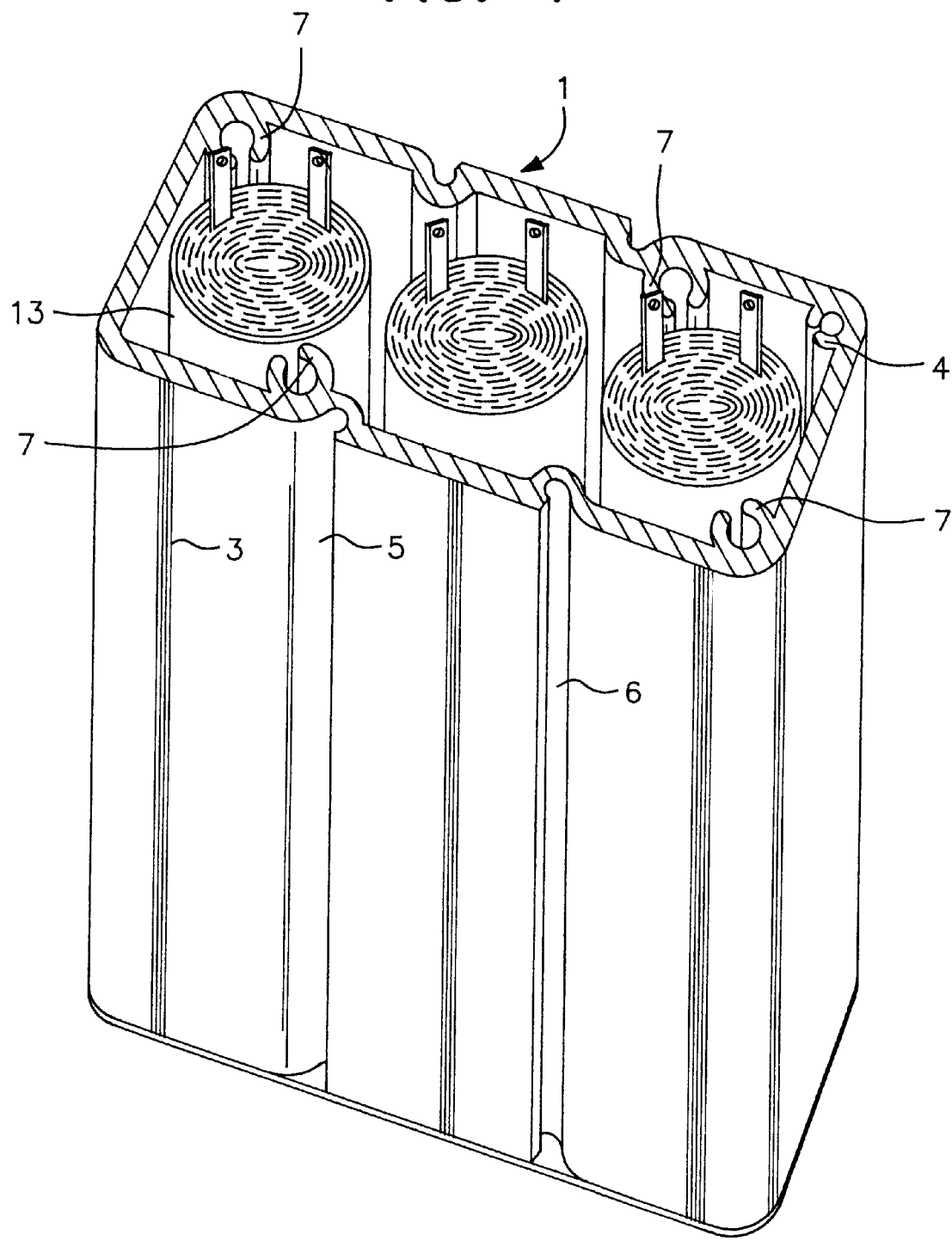
FIG. 4 shows a partial cut-out of a power capacitor according to the invention.

The windings 13 of the capacitor as shown in FIG. 4 are thus lodged inside the casing made of extruded aluminum. Thus the casing envelops the windings, which are in such a manner well protected, due to the rigidity of the casing.

The use of a casing in extruded aluminum also enables the integration of functional components, such as for example protection elements of capacitors by using the fixing grooves 7.

What is claimed is:

1. A power capacitor comprising at least one capacitor unit and a casing having a body, each capacitor unit comprising at least one winding, having at least two foils of insulating material, said capacitor unit being housed in the casing of which at least the body is made of extruded aluminum, which body surrounds said capacitor unit, said casing being provided with cooling wings, obtained upon extruding of the casing.

2. A power capacitor as claimed in claim 1, characterized in that at least one internal side of the casing is provided with fixing grooves, provided for fixing capacitor components.

3. A power capacitor as claimed in claim 2, characterized in that at least one internal side of the casing is provided with an earth groove of which the internal wall is provided with a screw thread for applying a screw.

4. A power capacitor as claimed in claim 1, characterized in that at least one internal side of the casing is provided with an earth groove of which the internal wall is provided with a screw thread for applying a screw.

5. A power capacitor as claimed in claim 1, characterized in that at least one external side of the casing is provided with at least one slide rail.

6. A power capacitor as claimed in claim 5, characterized in that a fixing element is provided for gripping into the slide rail.

7. A power capacitor comprising at least one capacitor unit and a casing having a body, each capacitor unit comprising at least one winding, having at least two foils of insulating material, said capacitor unit being housed in the casing of which at least the body is made of extruded aluminum, which body surrounds said capacitor unit, at least one internal side of the casing being provided with fixing grooves, provided for fixing capacitor components.

8. A power capacitor comprising at least one capacitor unit and a casing having a body, each capacitor unit comprising at least one winding, having at least two foils of insulating material, said capacitor unit being housed in the casing of which at least the body is made of extruded aluminum, which body surrounds said capacitor unit, at least one internal side of the casing being provided with an earth groove of which the internal wall is provided with a screw thread for applying a screw.

9. A power capacitor comprising at least one capacitor unit and a casing having a body, each capacitor unit comprising at least one winding, having at least two foils of insulating material, said capacitor unit being housed in the casing of which at least the body is made of extruded aluminum, which body surrounds said capacitor unit, at least one external side of the casing being provided with at least one slide rail.

10. A power capacitor as claimed in claim 9, characterized in that a fixing element is provided for gripping into the slide rail.

* * * * *